US 6,720,950 B2

(12) United States Patent
Cheng

(10) Patent No.: US 6,720,950 B2
(45) Date of Patent: Apr. 13, 2004

(54) MOUSE SEAT WITH STERILIZING AND DEODORIZING ABILITY

(76) Inventor: Hsing-Chien Cheng, No. 15, Alley 6, Lane 289, Chung-Ching Rd., Taipei (TW)

( * ) Notice: Subject to any disclaimer, the term of this patent is extended or adjusted under 35 U.S.C. 154(b) by 356 days.

(21) Appl. No.: 09/982,446

(22) Filed: Oct. 17, 2001

(65) Prior Publication Data

US 2003/0071790 A1 Apr. 17, 2003

(51) Int. Cl.$^7$ ................................................. G09G 5/00
(52) U.S. Cl. ...................... 345/163; 422/24; 422/186.3; 250/455.11
(58) Field of Search ................................. 345/156, 163, 345/168, 161, 167, 173; 248/118, 118.1, 118.3; 422/22, 24, 5; 250/455.11

(56) References Cited

U.S. PATENT DOCUMENTS

| | | | | |
|---|---|---|---|---|
| 5,487,877 A | * | 1/1996 | Choi | 422/300 |
| 5,547,635 A | * | 8/1996 | Duthie, Jr. | 422/24 |
| 6,278,122 B1 | * | 8/2001 | Gagnon | 250/455.11 |
| 6,458,331 B1 | * | 10/2002 | Roberts | 422/186.3 |

* cited by examiner

*Primary Examiner*—Bipin Shalwala
*Assistant Examiner*—Ricardo Osorio
(74) *Attorney, Agent, or Firm*—Pro-Techtor International Services

(57) ABSTRACT

A mouse seat with sterilizing and deodorizing ability, wherein, an ultraviolet lamp pipe is mounted in a seat coated with a titanium dioxide ($TiO_2$) layer, the ultraviolet lamp pipe generates ultraviolet ray able to kill bacteria. Irradiation of the ultraviolet ray makes the oxygen in the air generate photochemical action to obtain ozone with the effects of sterilizing and deodorizing; and the titanium dioxide ($TiO_2$) layer on the seat absorbs the ultraviolet ray to form an effect of photocatalyzing, thereby the surface of the seat has the function of oxidizing and reduction to be antibacterial and dirt proofing. By sterilizing and deodorizing of the above stated ultraviolet ray, ozone and titanium dioxide ($TiO_2$) catalyst, a mouse in the seat can be thoroughly sterilized and deodorized.

1 Claim, 4 Drawing Sheets

MOUSE SEAT WITH STERILIZING AND DEODORIZING ABILITY

BACKGROUND OF THE INVENTION

1. Field of the Invention

The present invention is related to a mouse seat with sterilizing and deodorizing ability, in which the mouse is sterilized and deodorized by ultraviolet ray, ozone and titanium dioxide ($TiO_2$) etc., so that the mouse can be prevented from being a hotbed for breeding bacteria or a medium of infection of virus.

2. Description of the Prior Art

Since the information booming age came, conventional treatment of information in the way of handwriting has been gradually substituted by computers which are fast and easy in treatment. A computer is a necessary money making tool; and by virtue that the functions of Window get more and more close to perfection, popularity of it in application to computers gets higher and higher, this elevates the importance of a mouse among the peripheral equipments of a computer relatively.

It was seen recently in a newspaper of a case about infection of gonorrhea virus by a mouse, the contents of the news are: "A male patient carrying gonorrhea virus contacted urine with his hands during pissing and washed his hands only with water without further sterilizing, then he used a mouse of a computer in the company to search information, the mouse of the computer was thereby infected with gonorrhea virus; some officemate in the company knowing nothing of this contacted the used mouse of the computer and was infected with the gonorrhea virus . . ."

It is evidently therefore, the frequency of using of a mouse among the peripheral equipments of a computer is larger than those of other peripheral equipments of the computer; it will become a hotbed for breeding bacteria or a medium of infection of virus after long use if there is no appropriate periodic sterilizing and deodorizing process.

Thereby, In view of the above stated problems, the inventor provided the present invention to overcome the problems after study and development with experience of manufacturing and selling of many years and continuous hard study works, tests and improvements.

SUMMARY OF THE INVENTION

The primary object of the present invention is to provide a mouse seat with sterilizing and deodorizing ability, by which the bacteria in the mouse can be thoroughly killed by ultraviolet ray, ozone and titanium dioxide ($TiO_2$) etc. to thereby prevent breeding or propagation of virus.

To get the above object, the present invention uses the following technical features, principally, an ultraviolet lamp pipe is mounted in a seat coated with a titanium dioxide ($TiO_2$) layer, the ultraviolet lamp pipe generates ultraviolet ray able to kill bacteria. Irradiation of the ultraviolet ray makes the oxygen in the air generate photochemical action to obtain ozone with the effects of sterilizing and deodorizing; and the titanium dioxide ($TiO_2$) layer ($TiO_2$) on the seat absorbs the ultraviolet ray to form an effect of photocatalyzing, thereby, the surface of the seat has the function of oxidizing and reduction to be antibacterial and dirt proofing. By sterilizing and deodorizing of the above stated ultraviolet ray, ozone and titanium dioxide ($TiO_2$) catalyst, a mouse in the seat can be thoroughly sterilized and deodorized.

The present invention will be apparent in the above stated object and features after reading the detailed description of the preferred embodiment thereof in reference to the accompanying drawings.

DETAILED DESCRIPTION OF THE PREFERRED EMBODIMENT

Figure 3:
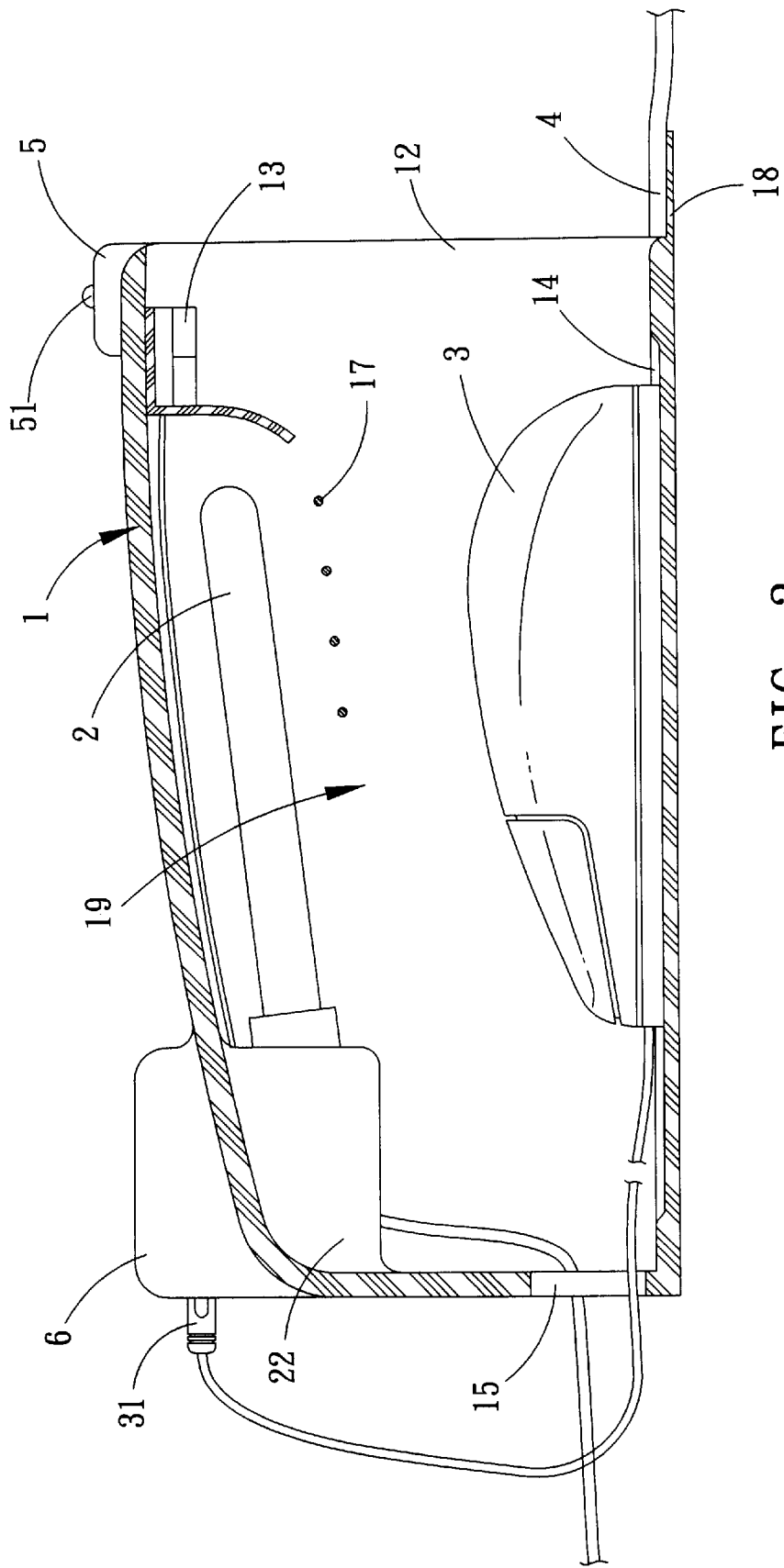
FIG. 3 is a sectional view of the present invention.
Figure 4:
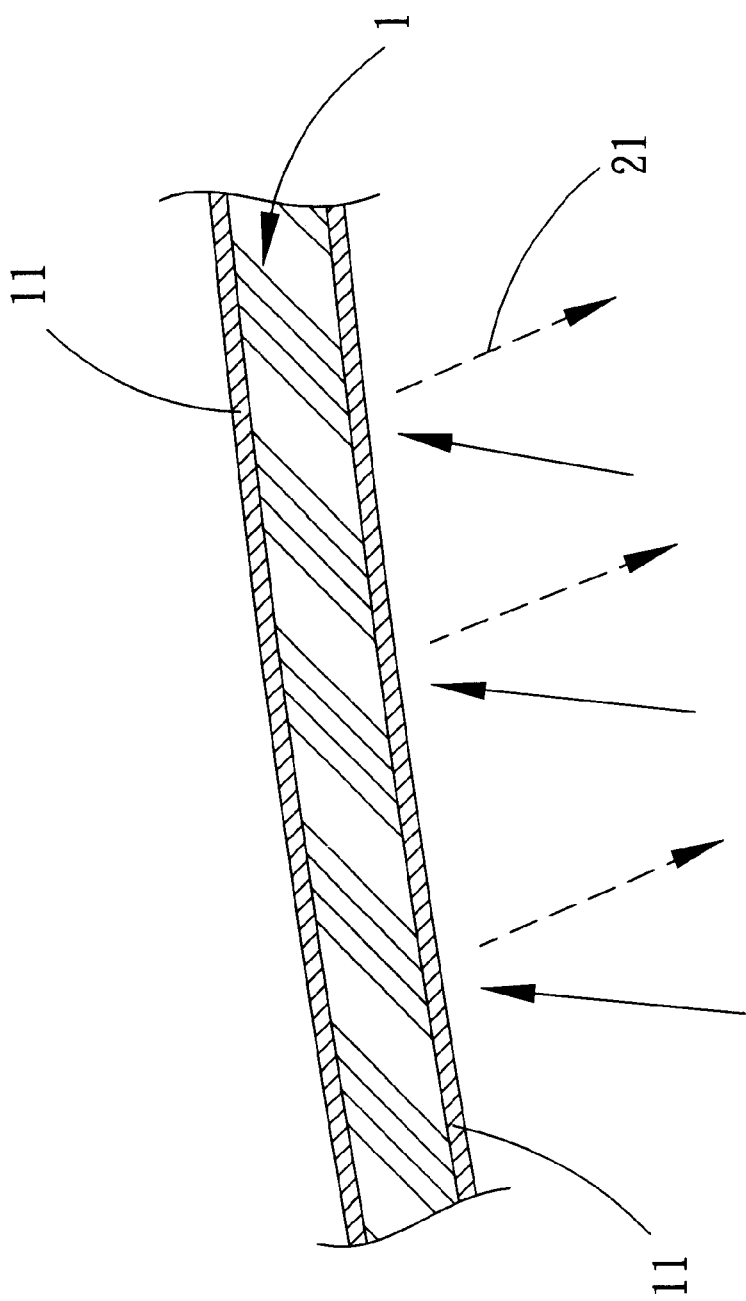
FIG. 4 is a sectional view of the seat of the present invention.

Referring to the FIG. 3, the mouse seat with sterilizing and deodorizing ability of present invention is disclosed with the sectional view, and is comprised of a seat 1, a titanium dioxide ($TiO_2$) coat 11, an ultraviolet lamp pipe 2 and an infrared sensor 13 (referring to FIGS. 3 and 4). Wherein:

The seat 1 is rectangular, and is provided with a receiving chamber 19, a PS/2 socket 6 and a timer 5. The receiving chamber 19 is provided for placing therein a mouse 3. The PS/2 socket 6 is provided for insertion of a PS/2 plug 31 of the mouse 3. The timer 5 is provided with an indicating light 51. One end of the seat 1 is provided with an opening 12, while the other end is provided with a power source hole 15; the seat 1 is provided therein at an upper position with a plurality of protecting rods 17, and a recess 14 is provided at the internal bottom of the seat 1; the end of the seat 1 having the opening 12 is provided on the bottom thereof with an extension connecting-sheet 18.

The ultraviolet lamp pipe 2 is mounted at an upper position in the seat 1; the protecting rods 17 are allocated beneath it.

The titanium dioxide ($TiO_2$) coat 11 is coated on the seat 1.

The infrared sensor 13 is mounted at an upper position at one end of the seat 1 with the opening 12.

Figure 1:
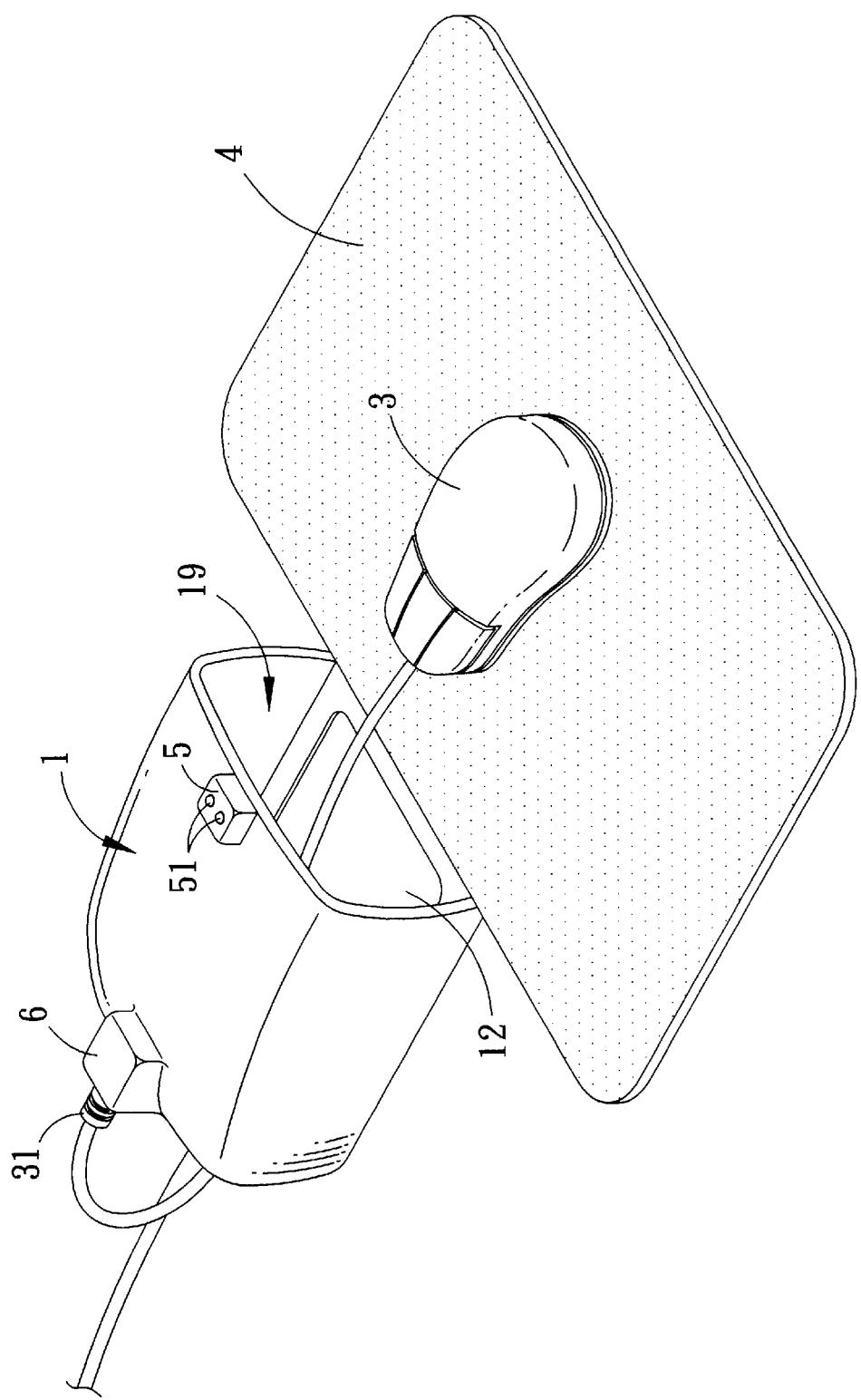
FIG. 1 is a perspective view of the present invention.

The mouse seat with sterilizing and deodorizing ability of present invention is connected to a mouse pad 4 by means of the extension connecting-sheet 18 provided on the bottom of the opening 12 of the seat 1. Therefore, the mouse seat with sterilizing and deodorizing ability of present invention is mounted on one side of the mouse pad 4 (as shown in FIG. 1).

Figure 2:
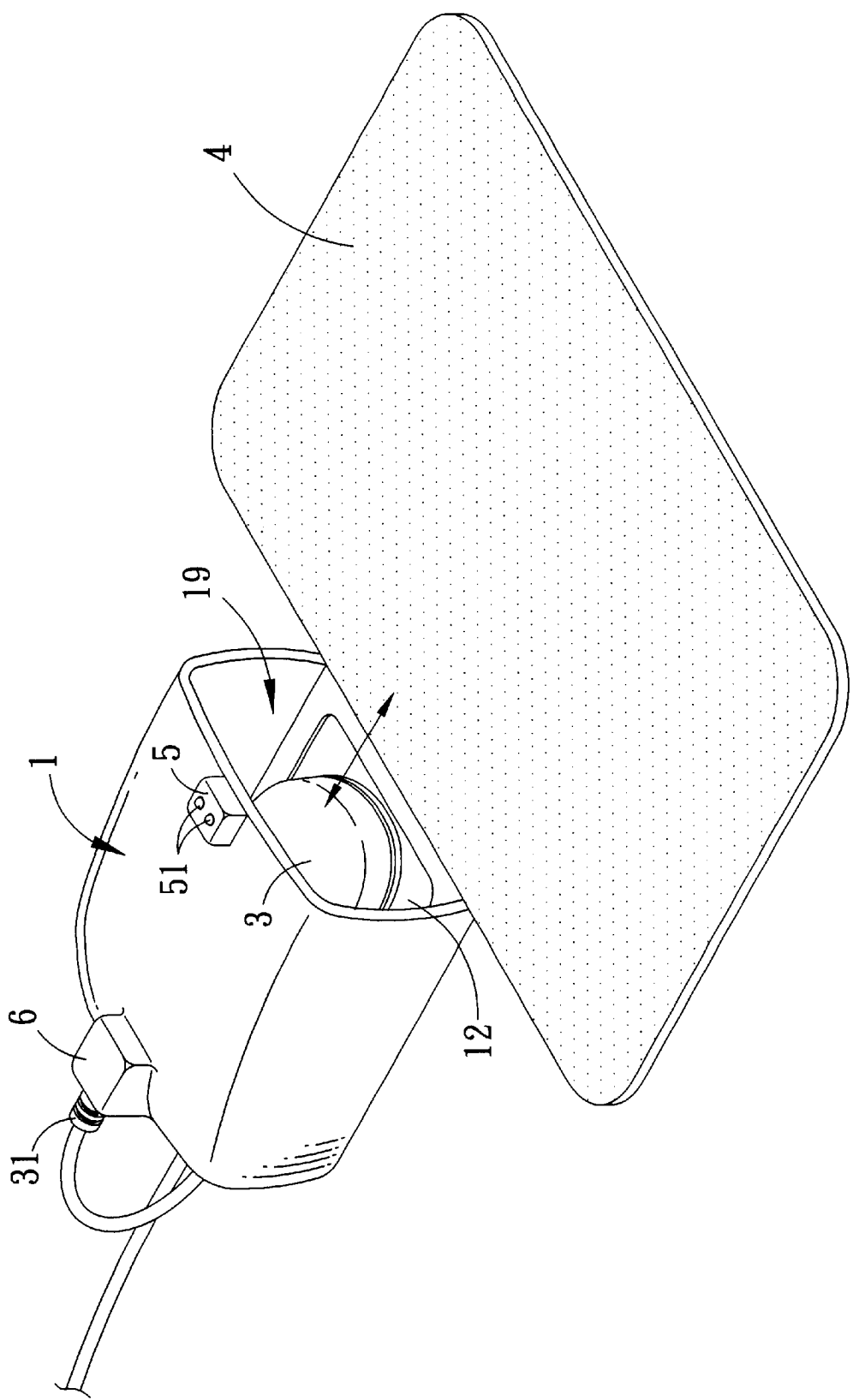
FIG. 2 is a perspective view showing a mouse is placed in the present invention.

When a user places the mouse 3 into the receiving chamber 19 through the opening 12 (as shown in FIG. 2), the infrared sensor 13 above the opening 12 senses (as shown in FIG. 3) to turn on the ultraviolet lamp pipe 2. At this time, the timer 5 starts counting, while the indicating light 51 above the timer 5 starts flashing. 2–3 minutes later, the ultraviolet lamp pipe 2 will extinguish automatically, and the indicating light 51 above the timer 5 too, so that the user can be aware that the operation of sterilizing and deodorizing of the mouse 3 has been completed.

And by protection of the protecting rods 17 allocated beneath the ultraviolet lamp pipe 2, damage of the ultraviolet lamp pipe 2 possibly induced when the mouse 3 is placed into the receiving chamber 19 can be avoided, and the mouse 3 can be moved outwardly from the power source hole 15. Through cleaning by sterilizing and deodorizing taking advantage of ultraviolet ray 21 generated by the ultraviolet lamp pipe 2, and by providing the recess 14 in the seat 1, the mouse 3 is placed in the seat 1 without random sliding.

By Irradiation of the ultraviolet ray 21 generated by the ultraviolet lamp pipe 2, the oxygen in the air generates photochemical action to obtain ozone. And by the feature that ozone can move together with air, the bacteria at the areas where irradiation of the ultraviolet ray 21 on them is impossible can be killed; therefore, the function of sterilizing of the mouse can be more perfect.

Further, ozone can effectively neutralize gas with foul odor such as underarm odor of a human body to decompose it into non-toxic fresh air rapidly in a very short time, thereby an effect of deodorization is obtained, the odor on the mouse 3 can be eliminated in this way.

The titanium dioxide ($TiO_2$) coat 11 coated on the seat 1 can absorb the ultraviolet ray 21 to form an effect of photocatalyzing (as shown in FIG. 4); it has the function of oxidizing, reduction, dirt proofing and deodorizing, and thereby the surface of the seat 1 can be cleaned and can be prevented from getting virus.

The mouse seat with sterilizing and deodorizing ability as stated above is mounted aside of the mouse pad 4 in an embodiment, or can be mounted aside of a terminal of a computer to save space. A fact shall be stated that it is within the scope of the present invention so long the seat 1 is coated with the titanium dioxide ($TiO_2$) coat 11, and is mounted therein with the ultraviolet lamp pipe 2, and is provided with the receiving chamber 19 to place therein the mouse 3; thereby the mouse 3 can be sterilized and deodorized. The ultraviolet lamp pipe 2 can be connected to a 5V power source of the PS/2 socket 6 through the computer, hence the ultraviolet lamp pipe 2 do not need to be connected to any other external power source.

In conclusion, the mouse seat with sterilizing and deodorizing ability of the present invention can thoroughly complete the cleaning works of killing bacteria and deodorization taking advantage of ultraviolet ray, ozone and titanium dioxide ($TiO_2$) etc. to thereby prevent the mouse from being a hotbed for breeding bacteria or a medium for propagation of virus. In view of this, the present invention is inventive in combining a sterilizing and deodorizing device with the peripheral equipments of a computer, and is industrially practical, convenient and novel.

Having thus described my invention, what I claim as new and desire to be secured by Letters Patent of the United States are:

1. A mouse seat with sterilizing and deodorizing ability, said mouse seat is mounted aside of a mouse pad, and is comprised of a seat, a titanium dioxide ($TiO_2$) coat and an ultraviolet lamp pipe, said mouse seat is characterized by:

said seat is provided with a receiving chamber for placing therein a mouse and is provided therein with said ultraviolet lamp pipe, said seat is coated thereon with said titanium dioxide ($TiO_2$) coat.

\* \* \* \* \*